United States Patent
Thomas et al.

(10) Patent No.: US 7,435,337 B2
(45) Date of Patent: Oct. 14, 2008

(54) USE OF CAESIUM-EXCHANGED FAUJASITE TYPE ZEOLITES FOR INTENSE DESULPHURIZATION OF A GASOLINE CUT

(75) Inventors: Michel Thomas, Lyons (FR); Alexandre Nicolaos, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 124 days.

(21) Appl. No.: 11/445,456

(22) Filed: Jun. 2, 2006

(65) Prior Publication Data
US 2006/0287192 A1    Dec. 21, 2006

(30) Foreign Application Priority Data
Jun. 2, 2005   (FR) .................................. 05 05677

(51) Int. Cl.
*C10G 25/00* (2006.01)
*C10G 45/00* (2006.01)
*C10G 45/60* (2006.01)
*C10G 45/64* (2006.01)

(52) U.S. Cl. .................. 208/213; 208/208 R; 208/226; 208/230; 208/248

(58) Field of Classification Search ............. 208/208 R, 208/213, 226, 230, 248
See application file for complete search history.

(56) References Cited

U.S. PATENT DOCUMENTS

| 3,849,292 | A | * | 11/1974 | Gleim ................... 208/111.15 |
| 4,188,285 | A | | 2/1980 | Michlmayr |
| 5,057,473 | A | | 10/1991 | Voecks et al. |
| 5,068,483 | A | | 11/1991 | Barthomeuf et al. |
| 5,516,421 | A | * | 5/1996 | Brown et al. ................. 208/140 |
| 5,843,300 | A | * | 12/1998 | Zinnen et al. ................ 208/250 |
| 5,935,422 | A | * | 8/1999 | Zinnen ................... 208/310 Z |
| 2002/0009404 | A1 | | 1/2002 | Tsybulevskiy |

* cited by examiner

*Primary Examiner*—Elizabeth D Wood
(74) *Attorney, Agent, or Firm*—Millen, White, Zelano & Branigan, P.C.

(57) ABSTRACT

The invention describes the application of caesium-exchanged X, Y or LSX type faujasite zeolites for intense desulphurization of FCC gasoline, and to a method for preparing said zeolites.

20 Claims, No Drawings

USE OF CAESIUM-EXCHANGED FAUJASITE TYPE ZEOLITES FOR INTENSE DESULPHURIZATION OF A GASOLINE CUT

FIELD OF THE INVENTION

The invention pertains to the use of a faujasite type partially caesium-exchanged zeolite (Cs) to carry out intense desulphurization of a mixture of hydrocarbons, typically a gasoline with boiling points in the range 25° C. to 300° C.

The use of that type of zeolite is of particular application in processes for desulphurization by adsorption of gasoline from a catalytic cracking process, in particular from fluid catalytic cracking, from cokefaction, from visbreaking or from pyrolysis. Said adsorption desulphurization processes may be operated in a fixed bed or simulated moving bed mode (CCS) and adsorption may be carried out both in the liquid phase and in the gas phase, preferably in the liquid phase.

Future specifications regarding automobile fuels will require a large reduction in the sulphur content, in particular in gasolines. Such a reduction is principally intended to limit the amount of oxides of sulphur and nitrogen in automobile exhausts.

European legislation defines specifications for fuel gasoline which, in 2000, were 150 ppm of sulphur, 1% of benzene, 42% of aromatics, 18% of olefins, and in 2005 are 50 ppm of sulphur, and 35% of aromatics. Analogous changes in standards have already been made in the United States which on have required gasoline to be produced with 30 ppm of sulphur since 2004.

Thus, the changes in specifications regarding the amount of sulphur in fuels require the development of novel processes for intense desulphurization of gasolines.

Gasoline bases are principally constituted by cracked gasolines, principally the gasoline fraction from a process for catalytically cracking an atmospheric or vacuum distillation residue from a crude oil (process usually termed FCC, fluid catalytic cracking).

The fraction of gasoline from catalytic cracking, which represents on average 40% of gasoline bases, contributes more than 90% of the sulphur of said gasoline.

As a result, the production of low sulphur gasoline reauires a step for desulphurizing catalytically cracked gasoline. Other sulphur-rich gasolines which may be cited are coking gasoline, coking being a thermal process applied to a vacuum residue type feed, producing an aromatic gasoline with a high sulphur content and, to a lesser extent, gasoline derived directly from atmospheric distillation or steam cracking gasolines.

The present invention is preferably applied to any gasoline cut with a cut point in the range 25° C. to 300° C.

DISCUSSION OF PRIOR ART

Currently, gasoline is conventionally desulphurized in one or more steps for bringing the sulphur-containing compounds contained in said gasoline into contact with a gas which is rich in hydrogen in a process termed hydrodesulphurization, in which organic sulphur is transformed into hydrogen sulphide ($H_2S$), which is then separated from the desulphurized gasoline by degassing. Other known gasoline desulphurization pathways are processes for purifying gasoline by adsorption of sulphur-containing compounds onto a selective adsorbent.

As an example, United States patent U.S. Pat. No. 3,620,969 recommends the use of a X, Y, L or omega type zeolite to desulphurize a liquid hydrocarbon by adsorption.

U.S. Pat. No. 6,428,685 describes contact with a specific solid based on silica, alumina and zinc oxide, supplemented with calcium, containing a promoter comprising nickel the valency of which has been reduced to a value of 2 or less, to desulphurize a FCC gasoline or a gas oil.

To our knowledge, the use of a faujasite type zeolite, partially exchanged with caesium, as a solid adsorbent to carry out intense gasoline desulphurization has not been described in the prior art.

BRIEF DESCRIPTION OF THE INVENTION

In a first aspect, the present invention pertains to a type X, Y or LSX faujasite zeolite with general formula $M_{x/n}[(AlO_2)_x][(SiO_2)_y].zH_2O$, the cation M of which is partially exchanged with caesium.

The invention also pertains to a process for desulphurizing a gasoline cut with a boiling point in the range 25° C. to 300° C. using said partially caesium-exchanged zeolite as a solid adsorbent.

Finally, the invention concerns a method for preparing said zeolite from a type X, Y or LSX faujasite zeolite.

In accordance with the invention, we describe a faujasite type zeolite with general formula $M_{x/n}[(AlO_2)_x][(SiO_2)_y].zH_2O$, with a Si/Al ratio in the range 1 to 10, preferably in the range 1 to 3, the cation M being partially exchanged with caesium, the degree of exchange being in the range 2% to 98%, preferably in the range 20% to 80% and more preferably in the range 30% to 70%, having a meso- and macro-porosity volume in the range 0.25 $cm^3/g$ to 0.40 $cm^3/g$, with a micro-porosity volume in the range 0.12 $cm^3/g$ to 0.35 $cm^3/g$, and with a crystal size of less than 3 microns, preferably less than 2 microns.

The desulphurization process in which the partially caesium-exchanged faujasite zeolite of the invention is to be used is a process for intense desulphurization of a gasoline cut with a boiling point in the range 25° C. to 300° C., or any cut extracted from said gasoline cut, employing adsorption on said type X or Y faujasite zeolite, with general formula $M_{x/n}[(AlO_2)_x][(SiO_2)_y].zH_2O$.

The process in which the partially caesium-exchanged faujasite zeolite of the invention is to be used may be a fixed bed process or a moving bed process or a simulated moving bed process as described in French patent FR-A-2 785 196. The method for preparing the partially caesium-exchanged faujasite zeolite of the invention is described in the detailed description of the invention.

DETAILED DESCRIPTION OF THE INVENTION

Desulphurizing FCC gasoline essentially aims to eliminate sulphur-containing compounds present in the form of thiophene and benzothiophene, said compounds possibly having been alkylated.

The presence of olefins and aromatics in the feed to be treated gives rise to competitive adsorption with sulphur-containing derivatives, which results in a reduction in the adsorption capacity as regards sulphur-containing derivatives.

The inventive advantage of using a faujasite zeolite as a solid adsorbent is to limit the effects of co-adsorption of olefinic and aromatic molecules from the feed and to increase the adsorption selectivity towards sulphur-containing derivatives present in the feed to be treated, in particular thiophene derivatives.

Intense desulphurization can preferably be carried out on the whole of a gasoline comprising compounds having boiling points in the range 25° C. to 300° C. (also termed the 25° C.-300° C. cut) or on only part of said gasoline, in particular on a light cut, for example a 25° C.-100° C. cut.

Depending on the cut point of the FCC gasoline under consideration, the approximate amounts of the various chemical families, and in particular on the sulphur-containing compounds, vary widely as shown in the table below which is given solely by way of example and is in no way limiting in scope:

| FCC gasoline: Typical composition (% by weight) | | | |
|---|---|---|---|
| Fractions | Complete gasoline | IP-53° C. cut | IP-90° C. cut |
| Saturated n-P | 5.82 | 9.48 | 7.39 |
| Saturated i-P | 22.69 | 28.77 | 30.18 |
| Naphthenes | 6.50 | 1.46 | 7.36 |
| Olefins | 40.25 | 60.25 | 52.74 |
| Aromatics | 24.75 | 0.04 | 2.34 |
| Sulphur-containing compounds (ppm) | 445 | 2 | 97 |

By selecting the cut point, it is thus possible to recover the majority of the thiophene and methyl-thiophene compounds in the light fraction of the gasoline, along with a major portion of the olefinic compounds, while limiting the quantity of aromatic compounds.

These latter are known to be compounds which are strongly adsorbed on conventional zeolites used in adsorption type separation processes. Thus, they are competitors for sulphur-containing compounds in the adsorption process.

The skilled person may readily select the cut point of the gasoline to be treated in a manner so as to minimize the fraction of aromatic compounds contained in said gasoline.

Thus, the present invention may be applied either to the whole of the gasoline cut or to a fraction of said gasoline cut in which the major portion of the sulphur-containing compounds is found.

The use of a particular faujasite type zeolite, partially exchanged with caesium, can allow adsorption of said thiophene compounds while limiting co-adsorption of olefinic and aromatic compounds present in the feed to be treated.

Zeolites from the faujasite family have the following general formula $M_{x/n}[(AlO_2)_x][(SiO_2)_y].zH_2O$ In which x and y are integers, n is the valency of the cation M, z is the number of molecules of water per unit cell.

Faujasite type zeolites for which the molar ratio Si/Al (y/x) is less than 1.15 are traditionally designated by the term X faujasites; those for which the Si/Al molar ratio is more than 1.15 are designated by the term Y faujasites; and those for which the Si/Al ratio is 1 are termed LSX.

Preferably, this Si/Al ratio (molar) is in the range 1 to 10, more preferably in the range 1 to 3.

Cation M, which ensures electroneutrality of the zeolite structure, generally belongs to alkali and/or alkaline-earth groups. In general, the most usual cations employed are sodium, calcium and barium.

It has surprisingly been discovered that using caesium as the exchange cation on a faujasite type zeolite can significantly increase the adsorption selectivity of thiophene derivatives contained in a gasoline, in particular a FCC gasoline, compared with the adsorption of aromatic compounds, in particular of the BTX type, and olefins contained in said gasoline.

The method for exchanging faujasite type zeolite which can change the original cation M to caesium is described below in the text. This method can be used to produce any degree of exchange between the original cation M and caesium.

The degree of exchange is the percentage by weight of caesium with respect to the mass of the original cation M.

According to the invention, the degree of exchange may be fixed at any value between 2% and 98%, preferably a value in the range 20% to 80%, and more preferably 30% to 70%.

Cation exchange is, for example, carried out by bringing a NaLSX, NaX (conventionally denoted 13X) or NaY type faujasite zeolite into contact with an aqueous caesium salt solution. Said salt is preferably selected from the group constituted by: the chloride, bromide, fluoride, iodide, nitrate or sulphate.

In the remainder of the text, when a faujasite type zeolite is mentioned without further details, this means either the NaLSX, NaX or NaY type.

Preferably, the caesium salt is caesium chloride, which has good solubility in water at ambient temperature, typically of the order of 10 moles/kg.

Exchange may be carried out on a zeolite which is initially in powder form, or which has already been shaped, for example into the shape of beads or extrudates. Preferably, exchange is carried out on the NaLSX, NaX or NaY zeolite which has already been shaped, for example into the shape of beads or extrudates.

The contact period necessary for exchange is typically less than 24 hours, preferably less than 12 hours, and more preferably less than 4 hours.

The exchange temperature is preferably in the range from ambient temperature to 90° C., more preferably in the range from ambient temperature to 60° C.

Ion exchange may be carried out in the static mode (batch) or in the dynamic mode (using a percolation technique, for example).

In the static and/or dynamic mode, several successive exchanges may be necessary to achieve high degrees of exchange, typically or more than 50%.

Depending on the temperature conditions, the caesium salt concentration, the nature of the anion and the ratio of the zeolite mass to the volume of the exchange solution, it is possible to vary the degree of exchange of the zeolite's initial cations, such as sodium, with the caesium cations.

After exchange, the exchanged zeolite is washed with water then dried at moderate temperature, typically less than 100° C., preferably in a stream of an inert gas such as nitrogen.

A high temperature calcining step is then carried out to encourage definitive positioning of the exchange cations. The temperature of this calcining step is preferably over 500° C. This calcining step is carried out in a stream of inert gas (for example nitrogen) or in air, possibly depleted.

The zeolite may be shaped before or after caesium exchange.

If exchange has been carried out on a zeolite which is initially in the form of a powder, it may be shaped after caesium exchange, using a binder and the usual techniques which are known to the skilled person, such as extrusion or granulation.

Shaping, generally by extrusion or granulation using techniques which are well known to the skilled person, may also be carried out on a zeolite powder before caesium exchange.

Whether shaping takes place before or after caesium exchange, the amount of binder used to carry out shaping is preferably less than 40% by weight, and preferably less than 20% by weight. The term "binder" generally means a clay, for example of the kaolinite type, which may be transformed into a zeolite, which means that it is possible in a subsequent step to transform the binder into a zeolite.

Preferably, the mean pore diameter of the solid adsorbent determined, for example, by sieving through a calibrated sieve, or by laser granulometric techniques, is less than 5 mm, preferably less than 2 mm, and preferably in the range 0.45 mm to 0.95 mm.

The mean diameter of the zeolite crystals is preferably less than 3 microns (determined, for example, by scanning electron microscopy) and preferably less than 2 microns.

This parameter is defined by the choice of the initial NaLSX, NaX or NaY zeolite.

The meso- and macro-porosity of the solid adsorbent, measured by the usual mercury porosimetry technique, is preferably in the range 0.25 $cm^3/g$ to 0.40 $cm^3/g$, depending on the amount of binder used.

The micro porosity of the solid adsorbent, measured by the usual technique of nitrogen porosimetry at 77K, is typically in the range 0.12 $cm^3/g$ to 0.35 $cm^3/g$ depending on the degree of cation exchange.

Before use in a process for desulphurizing FCC gasoline, the caesium-exchanged zeolite is activated at a temperature which is preferably below 250° C., in a stream of air or, as is preferable, of inert gas, to obtain a residual water content in the caesium-exchanged zeolite which is also termed the "loss on ignition", of less than 5% by weight, and preferably less than 2% by weight.

EXAMPLES (IN ACCORDANCE WITH THE INVENTION)

Examples 1, 2, 3 and 4 below compare the adsorption selectivities of NaX and NaY zeolites with those for their derivatives substituted with caesium, respectively CsX and CsY.

Point a) concerns the method for preparing caesium zeolites.

Point b) describes the analytical method used to measure the adsorption selectivities. Said points a) and b) are common to Examples 1, 2, 3 and 4.

a) Preparation of CsX and CsY Zeolites

Zeolites were prepared from NaX zeolite (produced by Ceca) or NaY zeolite (produced by Zeolyst) shaped into beads with a diameter of less than 1 mm, by cation exchange using an aqueous solution of caesium chloride (CSCl) the concentration of which was 0.5 mole/litre.

A volume of 10 millilitres of CsCl solution per gram of NaX or naY zeolite was used for all of the exchanges. Exchange was carried out at ambient temperature, with stirring, for 2 hours.

The exchanged zeolite was washed with water then recovered by filtering and dried at 80° C. for 18 hours. A calcining step was carried out for 1 hour at 500° C. in a stream of air.

Before use, the NaX or NaY zeolites were activated in a vacuum of $10^{-3}$ m of mercury at 350° C. for ? hours, then cooled to ambient temperature to obtain a residual water content of less than 2% by weight.

The zeolites obtained had the following analytical characteristics:
- the microporous volume and the specific surface area of the zeolites were measured by the conventional 77K nitrogen physisorption method;
- the elemental analyses (Al, Si, Na, Cs) were carried out using the atomic absorption technique;
- the mean crystal size of the zeolite, determined by scanning electron microscopy, was 2.5 microns.

TABLE 1

Characterization of CsX and CsY samples

| Zeolite | CsX | CsY |
|---|---|---|
| BET specific surface area ($m^2/g$) | 596 | 596 |
| Microporous volume ($cm^3/g$) | 0.237 | 0.237 |
| Degree of Cs/Na exchange (%) | 38 | 59 | b) Adsorption Under Dynamic Conditions

Sulphur-containing derivative adsorption was carried out continuously using conventional percolation plot technique in "echelon" mode. The apparatus used was constituted by:
- a steel column with an internal diameter of 4.6 mm and a length of 150 mm containing granular carborundum at the inlet to encourage homogeneous flow in the column, filled with the zeolite to be studied (about 1 gram);
- a liquid chromatography type pump (Gilson 307 model) to inject a constant flow of feed into the column at 1 millilitre/minute;
- a flow meter to measure the feed flow in the column;
- a feed tank containing the solution being studied, connected to the injection pump;
- a fraction collector placed at the column outlet to carry out analyses of the recovered effluents as a function of time.

The recovered effluents were analyzed by liquid chromatography with a Lichrospher RP18 type column at a flow rate of 1 ml/min, with UV-visible detection (Varian Prostar 340 model) using the following conditions:
- thiophene/heptane solution: 100 μl (1 μl=1 microlitre, i.e. $10^{-6}$ litre) of solution diluted in 1 ml of methanol at a wavelength of 231 nm (1 nm=1 nanometer, i.e. $10^{-9}$ metre);
- solution in the presence of toluene: dilution was carried out in a water/methanol mixture (70%/30% by volume) at the same wavelength.

The quantities adsorbed were calculated from the mean percolation time for the various compounds.

Example 1

In this example, we compared the influence of Na and Cs cations in X or Y zeolites on the adsorption of thiophene in solution in n-heptane in a concentration of 25 millimoles/litre of thiophene (equivalent to 1174 ppm by weight of S) in the absence of any other competing compound (olefin and aromatic) at ambient temperature. The results of the adsorption capacities of thiophene on NaX and CsX zeolites or on NaY and CsY zeolites are indicated in Table 2.

TABLE 2

Adsorption of thiophene on various zeolites

| Zeolite | NaX | CsX | NaY | CsY |
|---|---|---|---|---|
| Adsorbed thiophene (mg/g) | 172.2 | 105.0 | 239.4 | 145.3 |
| Adsorbed thiophene (mmol/g) | 2.05 | 1.25 | 2.85 | 1.73 |

The reduction in the adsorption capacity on CsX and CsY zeolites originated from the very high molar mass of the Cs cation and its bulk compared with the sodium cation. It should be noted that the adsorption capacity per se does not have to have increased by itself, but it has to have increased, but in the presence of a competing agent, to show up the gain in selectivity due to exchange with caesium, as shown in the next example.

Example 2

In this example, we compare the influence of Na and Cs cations in X or Y zeolites on the adsorption of thiophene in solution in n-heptane in a concentration of 25 millimoles/litre of thiophene, in the presence of an equimolar quantity of toluene as the competing agent at ambient temperature.

The results of the adsorption capacities of thiophene on NaX and CsX zeolites or on NaY and CsY zeolites are indicated in Table 3.

TABLE 3

Adsorption of thiophene in the presence of toluene for various zeolites

| Zeolite | NaX | CsX | NaY | CsY |
|---|---|---|---|---|
| Adsorbed thiophene (mg/g) | 126.8 | 104.2 | 82.3 | 115.9 |
| Adsorbed thiophene (mmol/g) | 1.51 | 1.24 | 0.98 | 1.38 |
| Adsorbed toluene (mg/g) | 110.4 | 31.3 | 185.8 | 41.4 |
| Adsorbed toluene (mmol/g) | 1.20 | 0.34 | 2.02 | 0.45 |
| Thiophene/toluene selectivity | 1.21 | 4.48 | 0.50 | 3.07 |

These results show the very beneficial effect of caesium exchange on the adsorption selectivity of thiophene as opposed to toluene.

Example 3

In this example, we compare the influence of Na and Cs cations in X or Y family zeolites on the adsorption of thiophene in solution in an equimolar mixture (1 mole/1 mole) of n-heptane/1-hexene in a concentration of 25 millimoles/litre of thiophene, at ambient temperature.

The results of the adsorption capacities of thiophene on NaX and CsX zeolites or on NaY and CsY zeolites are indicated in Table 4.

TABLE 4

Adsorption of thiophene in the presence of 1-hexene for various zeolites

| Zeolite | NaX | CsX | NaY | CsY |
|---|---|---|---|---|
| Adsorbed thiophene (mg/g) 0% 1-hexene | 172.2 | 105.0 | 239.4 | 145.3 |
| Adsorbed thiophene (mmol/g) 0% 1-hexene | 2.05 | 1.25 | 2.85 | 1.73 |
| Adsorbed toluene (mg/g) 50% 1-hexene* | 65.5 | 82.3 | 92.4 | 110.9 |
| Adsorbed toluene (mmol/g) 50% 1-hexene* | 0.78 | 0.98 | 1.10 | 1.32 |
| Adsorption capacity ratio (%) | 38.0 | 78.4 | 38.6 | 76.3 |

*Equimolar n-heptane/1-hexene mixture.

These results show the beneficial effect of caesium on the adsorption of thiophene in a mixture which is rich in 1-hexene, the drop in capacity being much more limited with these exchanged zeolites.

Example 4

In this example, we compare the influence of Na and Cs cations in X or Y family zeolites on the adsorption of thiophene in solution in n-heptane in the presence of 1-hexene and toluene (0.188 mole/litre and 4.0 moles/litre, i.e. 2.6% and 49.8% by weight respectively), in a concentration of 25 millimoles/litre of thiophene, at ambient temperature. The results of the adsorption capacities of thiophene on NaX and CsX zeolites or on NaY and CsY zeolites are indicated in Table 5.

TABLE 5

Adsorption of thiophene in the presence of 1-hexene and toluene for various zeolites

| Zeolite | NaX | CsX | NaY | CsY |
|---|---|---|---|---|
| Adsorbed thiophene (mg/g) | 47.4 | 69.3 | 29.2 | 55.4 |
| Adsorbed thiophene (mmol/g) | 0.564 | 0.825 | 0.348 | 0.660 |
| Adsorbed hexene (mg/g) | 21.0 | 0.4 | 44.7 | 0.8 |
| Adsorbed hexene (mmol/g) | 0.250 | 0.005 | 0.532 | 0.010 |
| Adsorbed toluene (mg/g) | 159.2 | 88.3 | 204.2 | 97.5 |
| Adsorbed toluene (mmol/g) | 1.73 | 0.96 | 2.22 | 1.06 |
| Thiophene QadsCsX(Y)/QadsNaX(Y) (%)* | / | 146.2 | / | 189.7 |

*Ratio, multiplied by 100, of the quantities adsorbed on CsX (or CsY) with respect to that adsorbed on NaX (or NaY).

These results clearly show the beneficial effect of caesium exchange on the adsorption of thiophene in solution in a mixture which is representative of a light FCC gasoline, since the quantity of adsorbed thiophene increased on the caesium-exchanged zeolites to the detriment of the quantity of olefin and aromatic.

The entire disclosures of all applications, patents and publications, cited herein and of corresponding French application No. 05/05.677, filed Jun. 2, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for intense desulphurization of a gasoline cut comprising subjecting said gasoline cut to adsorption on an adsorbent comprising a faujasite type zeolite of the general formula $M_{x/n}[(AlO_2)_x][(SiO_2)_y].zH_2O$, with a Si/Al atomic ratio in the range of 1 to 10, the cation M being partially exchanged with caesium, the degree of exchange being in the range of 2% to 98%, having a meso- and macro-porosity volume in the range of 0.25 cm$^3$/g to 0.40 cm$^3$/g, a micro-porosity volume in the range of 0.12 cm$^3$/g to 0.35 cm$^3$/g, and with a crystal size of less than 3 microns, wherein the cation M is an alkaline earth metal cation or an alkali metal cation other than caesium.

2. A desulphurization process according to claim 1, in which the Si/Al atomic ratio is in the range 1 to 3.

3. A desulphurization process according to claim 1, in which the degree of exchange is in the range of 20% to 80%.

4. A desulphurization process according to claim 1, in which the crystal size is less than 2 microns.

5. A desulphurization process according to claim 1, in which the adsorbent employed has a particle size less than 5 mm.

6. A desulphurization process according to claim 1, in which said gasoline cut comprises compounds with boiling points in the range 25° C. to 300° C.

7. A desulphurization process according to claim 1, in which the partially caesium-exchanged faujasite zeolite is prepared by:
   1) bringing a faujasite zeolite into contact with an aqueous solution of a caesium salt for a contact time of less than 24 hours and at a temperature in the range from ambient temperature to 90° C.;
   2) washing with water, then drying at a temperature of less than 100° C. in a stream of inert gas; and
   3) calcining the resultant dried zeolite.

8. A desulphurization process according to claim 7, in which the caesium salt is selected from the group consisting of: caesium chloride, bromide, fluoride, iodide, nitrate and sulphate, and mixtures thereof.

9. A desulphurization process according to claim 7, in which the zeolite is initially in powder form, exchanged with caesium, then is mixed with binder and shaped by extrusion or granulation after caesium exchange, the amount of binder used to carry out said extrusion or said granulation being less than 40% by weight.

10. A desulphurization process according to claim 7, in which the zeolite is initially in powder form, then is mixed with binder and shaped by extrusion or granulation before caesium exchange, the amount of binder used to carry out said extrusion or said granulation being less than 40% by weight.

11. A desulphurization process according to claim 7, in which prior to use, the zeolite is activated so that the loss on ignition is less than 5% by weight.

12. A desulphurization process according to claim 7, in which the caesium salt in aqueous solution is caesium chloride.

13. A desulphurization process according to claim 2, in which the degree of exchange is in the range of 20% to 80%.

14. A desulphurization process according to claim 2, in which the crystal size is less than 2 microns.

15. A desulphurization process according to claim 13, in which the crystal size is less than 2 microns.

16. A desulphurization process according to claim 7, wherein the faujasite zeolite is in the sodium form prior to being partially exchanged with caesium.

17. A desulphurization process according to claim 7, wherein the calcining is conducted at a temperature over 500° C.

18. A desulphurization process according to claim 16, wherein the calcining is conducted at a temperature over 500° C.

19. A desulphurization process according to claim 1, wherein said gasoline cut is an FCC gasoline.

20. A desulphurization process according to claim 19, wherein the degree of exchange is in the range of 30% to 70%.

* * * * *